(12) United States Patent
Aten (10) Patent No.: US 11,613,372 B2
(45) Date of Patent: Mar. 28, 2023

(54) DUCTED FAN CASE ATTACHMENT STRUCTURE

(71) Applicant: Rohr, Inc., Chula Vista, CA (US)

(72) Inventor: Michael Aten, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 289 days.

(21) Appl. No.: 17/093,152

(22) Filed: Nov. 9, 2020

(65) Prior Publication Data
US 2022/0144442 A1 May 12, 2022

(51) Int. Cl.
*B64D 29/02* (2006.01)
*B64D 33/02* (2006.01)

(52) U.S. Cl.
CPC ...... *B64D 29/02* (2013.01); *B64D 2033/0286* (2013.01)

(58) Field of Classification Search
CPC . B64D 29/02; B64D 29/06; B64D 2033/0286
USPC ......................................................... 244/54
See application file for complete search history.

(56) References Cited

U.S. PATENT DOCUMENTS

| | | | | |
|---|---|---|---|---|
| 3,727,862 A | * | 4/1973 | Kaufhold | B64D 27/26 244/54 |
| 3,979,087 A | * | 9/1976 | Boris | B64D 27/18 244/54 |
| 4,266,741 A | * | 5/1981 | Murphy | F02C 7/20 244/54 |
| 4,449,680 A | * | 5/1984 | Gratzer | B64D 29/02 244/54 |
| 7,435,050 B2 | | 10/2008 | Welch | |
| 7,740,200 B2 | | 6/2010 | Diochon et al. | |
| 8,640,987 B2 | * | 2/2014 | Journade | B64D 27/18 244/54 |
| 8,739,552 B2 | * | 6/2014 | Vauchel | B64D 29/00 244/54 |
| 10,287,918 B2 | | 5/2019 | Quinn et al. | |
| 2008/0010969 A1 | * | 1/2008 | Hauer | F02K 1/72 60/204 |
| 2008/0116334 A1 | * | 5/2008 | Xie | B29D 99/0014 248/205.1 |
| 2008/0121754 A1 | * | 5/2008 | Marche | B64D 27/20 244/54 |
| 2009/0260344 A1 | * | 10/2009 | Hoyland | F02K 1/70 415/213.1 |
| 2010/0024435 A1 | * | 2/2010 | Vauchel | B64D 29/08 244/54 |
| 2010/0155525 A1 | | 6/2010 | Stuart et al. | |
| 2011/0215193 A1 | | 9/2011 | Welch et al. | |

(Continued)

FOREIGN PATENT DOCUMENTS

GB  2320525  6/1998

OTHER PUBLICATIONS

European Patent Office; European Search Report dated Mar. 25, 2022 in Application No. 21206739.1.

*Primary Examiner* — Brady W Frazier
(74) *Attorney, Agent, or Firm* — Snell & Wilmer L.L.P.

(57) ABSTRACT

A ducted fan engine module and method of assembling the same is disclosed. In various embodiments, the ducted fan engine module includes a ducted fan engine having a ducted fan case configured to house a fan; a lower V-blade fitting secured to a lower frame; and an upper V-blade fitting secured to an upper frame.

17 Claims, 6 Drawing Sheets

(56) References Cited

U.S. PATENT DOCUMENTS

| | | | |
|---|---|---|---|
| 2011/0290934 A1* | 12/2011 | Journade | B64D 27/26 244/54 |
| 2015/0098810 A1 | 4/2015 | Soria et al. | |
| 2016/0046381 A1* | 2/2016 | Barmichev | B64D 27/02 244/54 |
| 2017/0259928 A1 | 9/2017 | Lambey et al. | |
| 2017/0260928 A1 | 9/2017 | Crawford | |
| 2018/0118355 A1 | 5/2018 | Pautis et al. | |
| 2019/0061966 A1* | 2/2019 | West | B64C 7/02 |

* cited by examiner

DUCTED FAN CASE ATTACHMENT STRUCTURE

FIELD

The present disclosure relates generally to ducted fan case attachment structures and, more particularly, ducted fan case attachment structures having V-blade fittings configured to mate with V-groove structures incorporated into a ducted fan case.

BACKGROUND

Ducted fan engines typically comprise multiple components that are joined together and assembled within a ducted fan case. The ducted fan case is then housed within and secured to a frame structure within a vehicle, such as, for example, an airframe structure of an aircraft, via an attachment structure. Efficiently retaining a ducted fan engine within a vehicle frame presents a variety of challenges, as the attachment structure may be subjected to substantial loads in each of the axial, lateral and radial directions as well as substantial torque loads about the axial direction. Providing efficient access to the ducted fan engine (e.g., for removal or repair of the engine) also presents challenges as the attachment structure may comprise complicated substructures that require time-consuming and expensive disassembly procedures.

SUMMARY

A method for assembling a ducted fan engine module is disclosed. In various embodiments, the method includes inserting a ducted fan engine into a lower V-blade fitting, the lower V-blade fitting secured to a lower frame; inserting the ducted fan engine into an upper V-blade fitting, the upper V-blade fitting secured to an upper frame; and securing the upper frame structurally to the lower frame.

In various embodiments, the ducted fan engine includes a ducted fan case having a lower V-groove configured to receive the lower V-blade fitting. In various embodiments, the ducted fan case includes an upper V-groove configured to receive the upper V-blade fitting.

In various embodiments, the lower V-blade fitting is configured to extend about one-hundred eighty degrees about the ducted fan case in a circumferential direction when received by the lower V-groove. In various embodiments, the upper V-blade fitting is configured to extend about one-hundred eighty degrees about the ducted fan case in the circumferential direction when received by the upper V-groove. In various embodiments, the lower V-groove extends about the ducted fan case about one-hundred eighty degrees in the circumferential direction. In various embodiments, the upper V-groove extends about the ducted fan case about one-hundred eighty degrees in the circumferential direction. In various embodiments, the lower V-blade fitting is secured to the lower frame via a first fastener. In various embodiments, the upper V-blade fitting is secured to the upper frame via a second fastener.

In various embodiments, at least one of the upper V-blade fitting and the lower V-blade fitting is characterized as having a half-circular geometry configured to mate with at least one of the upper V-groove and the lower V-groove.

A ducted fan engine module is disclosed. In various embodiments, the ducted fan engine module includes a ducted fan engine having a ducted fan case configured to house a fan; a lower V-blade fitting secured to a lower frame; and an upper V-blade fitting secured to an upper frame.

In various embodiments, the lower frame is connected to an airfoil of an aircraft wing. In various embodiments, the upper frame is connected to an airfoil of an aircraft wing. In various embodiments, the ducted fan case has a lower V-groove configured to receive the lower V-blade fitting. In various embodiments, the ducted fan case has an upper V-groove configured to receive the upper V-blade fitting.

In various embodiments, the lower V-blade fitting is configured to extend about one-hundred eighty degrees about the ducted fan case in a circumferential direction when received by the lower V-groove. In various embodiments, the upper V-blade fitting is configured to extend about one-hundred eighty degrees about the ducted fan case in the circumferential direction when received by the upper V-groove. In various embodiments, the lower V-groove extends about the ducted fan case about one-hundred eighty degrees in the circumferential direction. In various embodiments, the upper V-groove extends about the ducted fan case about one-hundred eighty degrees in the circumferential direction.

A ducted fan engine module is disclosed. In various embodiments, the ducted fan engine module includes a ducted fan engine having a ducted fan case configured to house a fan; a first V-blade fitting secured to a first frame; and a second V-blade fitting secured to a second frame.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
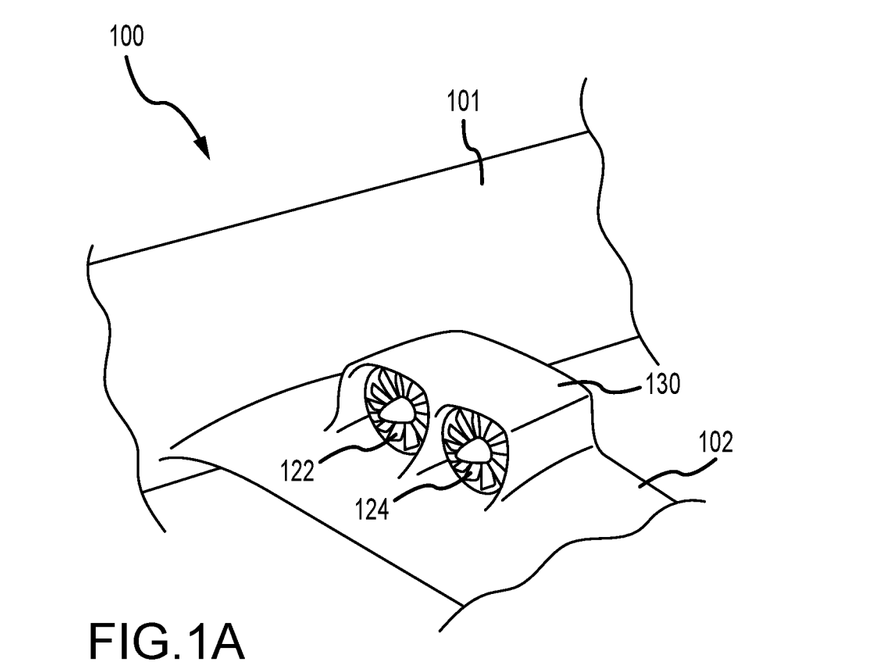
FIGS. 1A, 1B, 1C and 1D provide perspective schematic representations of various aircraft configurations having ducted fan engines, in accordance with various embodiments.
Figure 1B:
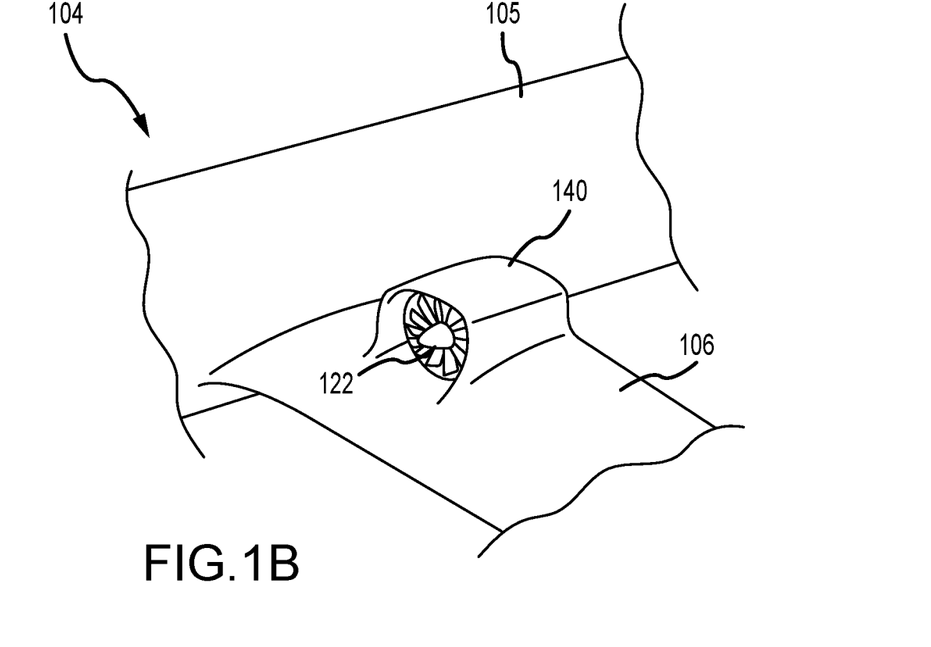
Figure 1C:
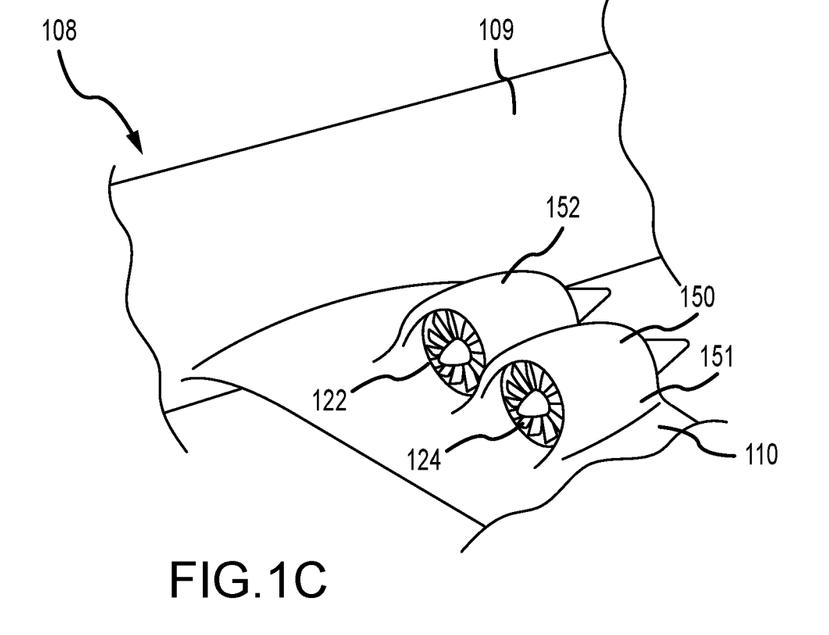
Figure 1D:
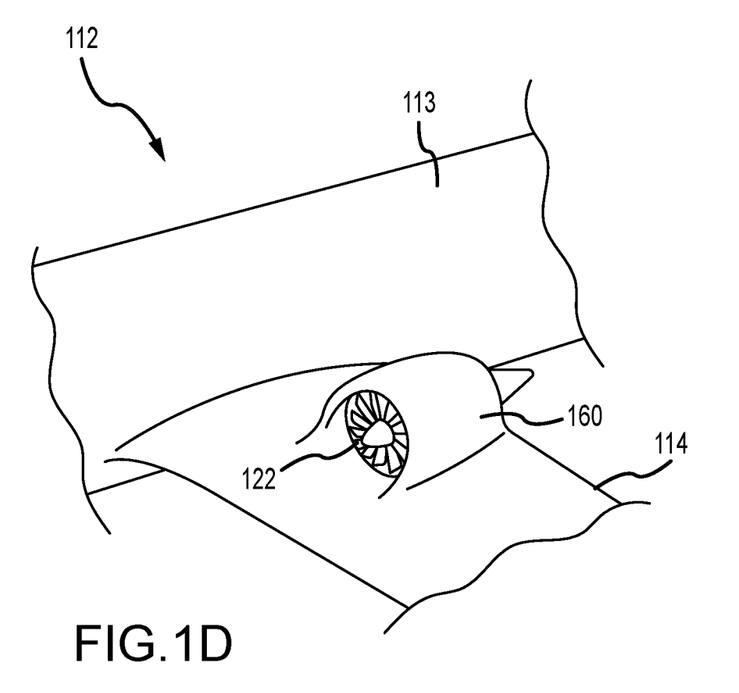

Referring now to the drawings, FIGS. 1A, 1B, 1C and 1D provide perspective schematic representations of an aircraft having a variety of ducted fan engine modules. For example, FIG. 1A illustrates an aircraft 100 having a fuselage 101 and an airfoil 102 connected to the fuselage 101. Positioned on and connected to the airfoil 102 is a ducted fan engine module 130 having a first ducted fan engine 122 and a second ducted fan engine 124 housed within a frame structure. Without loss of generality, each of the first ducted fan engine 122 and the second ducted fan engine 124 may include a fan driven by a gas turbine engine, an electric engine or some other manner of power. Referring to FIG. 1B, an aircraft 104 having a fuselage 105 and an airfoil 106 connected to the fuselage 105 is illustrated. Positioned on and connected to the airfoil 106 is a ducted fan engine module 140 having a single ducted fan engine, such as, for example, the first ducted fan engine 122 described above, housed within a frame structure. Similarly, FIG. 1C illustrates an aircraft 108 having a fuselage 109 and an airfoil 110 connected to the fuselage 109. Positioned on and connected to the airfoil 110 is a ducted fan engine module 150 having a first ducted fan engine and a second ducted fan engine, such as, for example, the first ducted fan engine 122 and the second ducted fan engine 122 described above, housed within a frame structure. In various embodiments, the ducted fan engine module 150 comprises a first ducted fan engine module 151 and a second ducted fan engine module 152, either connected to one another or disconnected from one another. Referring to FIG. 1D, an aircraft 112 having a fuselage 113 and an airfoil 114 connected to the fuselage 113 is illustrated. Positioned on and connected to the airfoil 114 is a ducted fan engine module 160 having a single ducted fan engine, such as, for example, the first ducted fan engine 122 described above, housed within a frame structure. The foregoing provide various possible configurations of ducted fan engine modules contemplated by the disclosure. Further, while the ducted fan engine modules are illustrated with respect to an aircraft, the disclosure contemplates other applications, such as, for example, sea-based or land-based vehicles.

Figure 2:
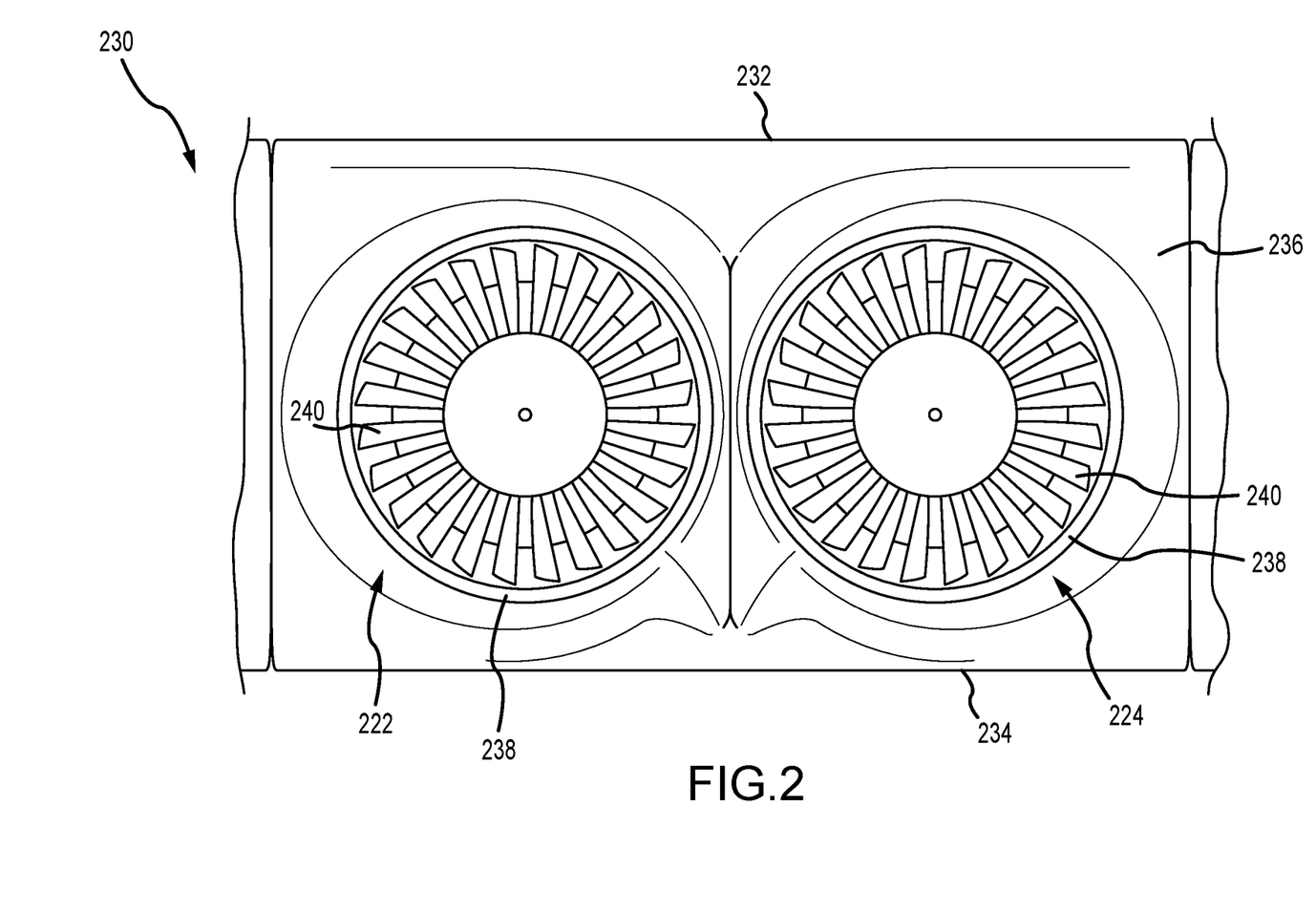
FIG. 2 is a schematic representation of a pair of ducted fan engines housed within an airframe structure, in accordance with various embodiments.

Referring now to FIG. 2, a ducted fan engine module 230, similar to the ducted fan engine module 130 described above with reference to FIG. 1A, is illustrated. The ducted fan engine module 230 includes a first frame structure 232 (or an upper frame or upper airframe structure) and a second frame structure 234 (or a lower frame or lower airframe structure). When the first frame structure 232 and the second frame structure 234 are assembled together, they provide a frame structure 236 (or an airframe structure) within which a first ducted fan engine 222 and a second ducted fan engine 224, similar to the first ducted fan engine 122 and the second ducted fan engine 124 described above, are housed and secured from movement with respect to the frame structure 236 due to the various loads and torques generated by the engines during operation. In various embodiments, each of the first ducted fan engine 222 and the second ducted fan engine 224 include a ducted fan case 238 within which a fan 240 is housed. As noted above, the fan may be driven by a gas turbine engine, an electric engine or some other manner of power. Further, it is noted that the first frame structure 232 and the second frame structure 234 may be incorporated into or form part of an airfoil or a wing or a fuselage of an aircraft.

Figure 3:
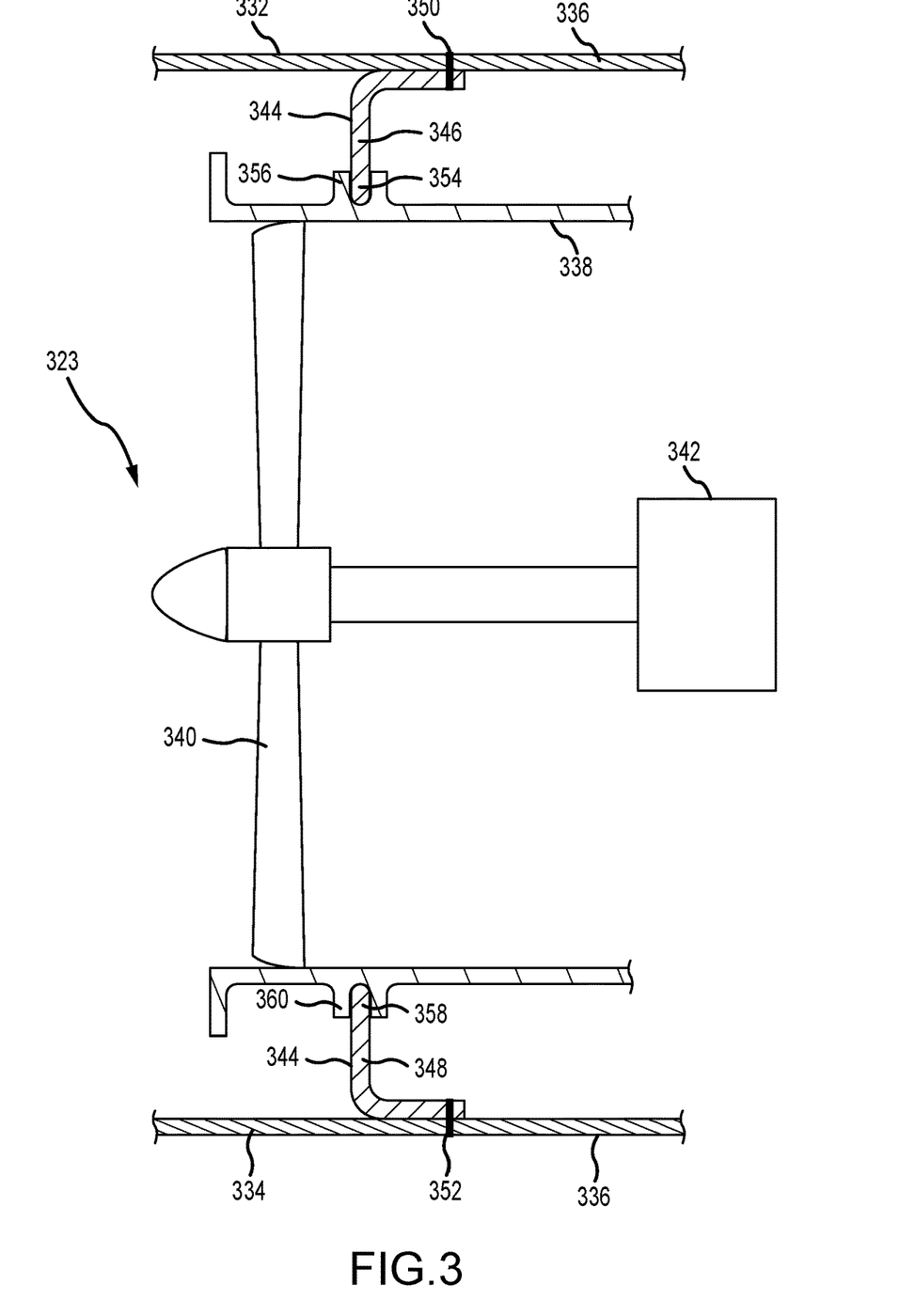
FIG. 3 is a cross sectional side schematic representation of a ducted fan engine housed within an airframe, in accordance with various embodiments.

Referring now to FIG. 3, a cross sectional side schematic representation of a ducted fan engine 323, similar to each of the first ducted fan engine 222 and the second ducted fan engine 224 described above, is illustrated. As described above, the ducted fan engine 323 includes a fan 340 that is rotatably disposed within a ducted fan case 338. In various embodiments, the fan 340 is driven by a power source 342, which may comprise a gas turbine engine, an electric engine or some other manner of power. Similar to the description above, the ducted fan case 338 is housed within a frame structure 336, which, in various embodiments, may include a first frame structure 332 (or an upper frame or upper airframe structure) and a second frame structure 334 (or a lower frame or lower airframe structure). The ducted fan case 338 is secured to the frame structure 336 via an attachment structure 344, which, in various embodiments, may include a first V-blade fitting 346 (e.g., an upper V-blade fitting) and a second V-blade fitting 348 (e.g., a lower V-blade fitting). In various embodiments, the first V-blade fitting 346 is secured to the first frame structure 332 via a first fastener 350 (or a first plurality of fasteners) and the second V-blade fitting 348 is secured to the second frame structure 334 via a second fastener 352 (or a second plurality of fasteners). The first fastener 350 and the second fastener 352 may comprise a bolt, a pin, a rivet, a weld or some similar fastener. Further, in various embodiments, the first V-blade fitting 346 may be constructed integrally with the first frame structure 332 (e.g., a single-piece or monolithic structure) and, similarly, the second V-blade fitting 348 may be constructed integrally with the second frame structure 334 (e.g., a single-piece or monolithic structure).

Still referring to FIG. 3, the first V-blade fitting 346 comprises a first protuberance 354 configured to be received within a first V-groove 356 (e.g., an upper V-groove) that is part of the ducted fan case 338. In similar fashion, the second V-blade fitting 348 comprises a second protuberance 358 configured to be received within a second V-groove 360 (e.g., a lower V-groove) that is part of the ducted fan case 338. While the first protuberance 354 and the second protuberance 358 are illustrated as having a half-circular geometry in cross section, configured to mate with similar half-circular geometries of the of the first V-groove 356 and the second V-groove 360, it is noted that other geometries are contemplated, such as, for example, a V-shaped geometry and a square-shaped geometry; accordingly, the terms V-blade and V-groove should not be narrowly limited to structures having V-shaped cross sectional geometries. Further, as will be appreciated from the embodiment illustrated at FIGS. 4A-4C, the first V-groove 356 and the second V-groove 360 may provide a single V-groove that extends in a circumferential direction about the entire circumference of the ducted fan case 338.

Figure 4A:
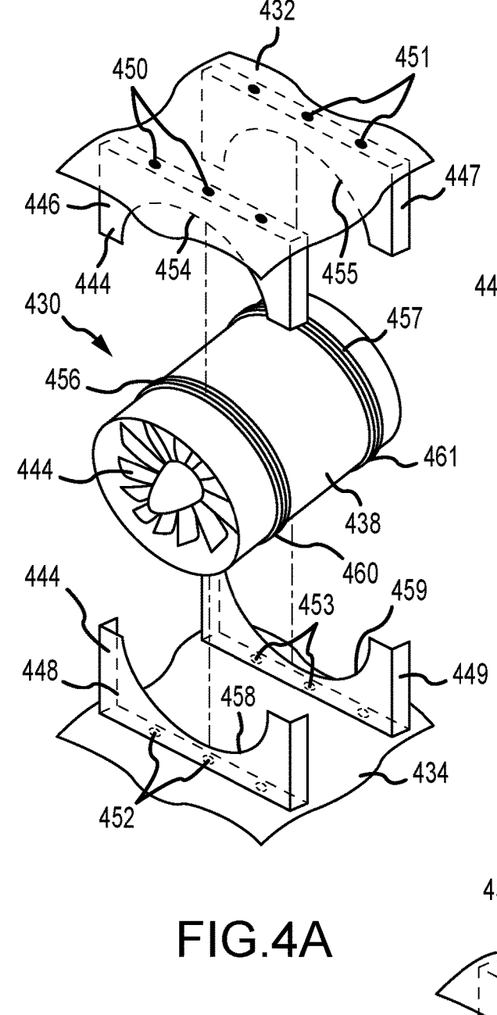
FIGS. 4A, 4B and 4C are schematic illustrations of a ducted fan engine being attached and secured to an airframe, in accordance with various embodiments.
Figure 4B:
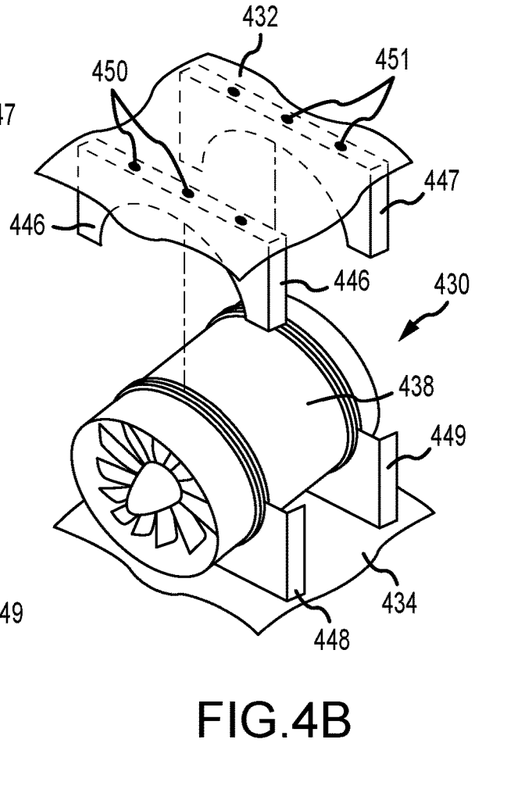
Figure 4C:
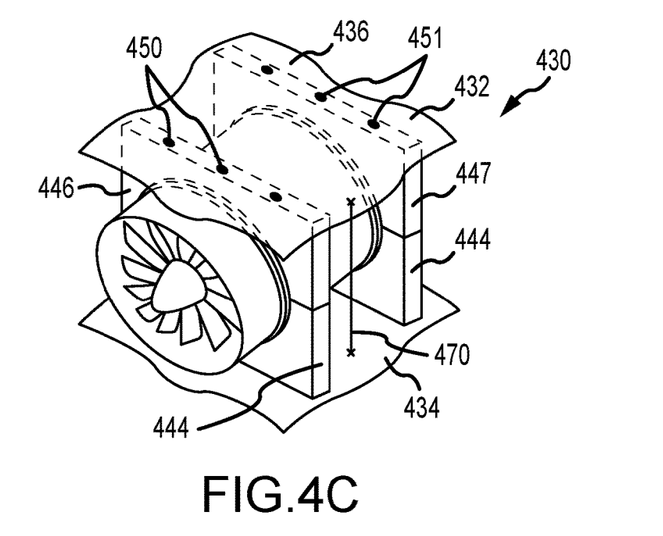

Referring now to FIGS. 4A, 4B and 4C, a series of steps are illustrated that describe the assembly of a ducted fan engine module 430, similar to the ducted fan engine module 130 described above with reference to FIG. 1A and the ducted fan engine module 230 described above with reference to FIG. 2. For the sake of simplicity, the ducted fan engine module 430 is illustrated as having a single ducted fan engine, though any number of ducted fan engines are contemplated for inclusion within the ducted fan engine module 430. As illustrated in FIG. 4A, when in an unassembled state, and as illustrated in FIG. 4C, when in an assembled state, the ducted fan engine module 430 includes a ducted fan engine 423 that includes a fan 440 that is rotatably disposed within a ducted fan case 438.

Similar to the description above, when in the assembled state, as illustrated in FIG. 4C, the ducted fan case 438 is housed within a frame structure 436, which, in various embodiments, may include a first frame structure 432 (or an upper frame or upper airframe structure) and a second frame structure 434 (or a lower frame or lower airframe structure). The ducted fan case 438 is secured to the frame structure 436 via an attachment structure 444, which, in various embodiments, may include a first forward V-blade fitting 446 (e.g., an upper forward V-blade fitting) and a second forward V-blade fitting 448 (e.g., a lower forward V-blade fitting). In various embodiments, the first forward V-blade fitting 446 is secured to the first frame structure 432 via a first forward fastener 450 (or a first plurality of forward fasteners) and the second forward V-blade fitting 448 is secured to the second frame structure 434 via a second forward fastener 452 (or a second plurality of forward fasteners). The first forward fastener 450 and the second forward fastener 452 may comprise a bolt, a pin, a rivet, a weld or some similar fastener. Further, in various embodiments, the first forward V-blade fitting 446 may be constructed integrally with the first frame structure 432 (e.g., a single-piece or monolithic structure) and, similarly, the second forward V-blade fitting 448 may be constructed integrally with the second frame structure 434 (e.g., a single-piece or monolithic structure).

Still referring to FIGS. 4A-4C, the attachment structure 444, in various embodiments, may include a first aft V-blade fitting 447 (e.g., an upper aft V-blade fitting) and a second aft V-blade fitting 449 (e.g., a lower aft V-blade fitting). In various embodiments, the first aft V-blade fitting 447 is secured to the first frame structure 432 via a first aft fastener 451 (or a first plurality of aft fasteners) and the second aft V-blade fitting 449 is secured to the second frame structure 434 via a second aft fastener 453 (or a second plurality of aft fasteners). The first aft fastener 451 and the second aft fastener 453 may comprise a bolt, a pin, a rivet, a weld or some similar fastener. Further, in various embodiments, the first aft V-blade fitting 447 may be constructed integrally with the first frame structure 432 (e.g., a single-piece or monolithic structure) and, similarly, the second forward V-blade fitting 448 may be constructed integrally with the second frame structure 434 (e.g., a single-piece or monolithic structure).

Similar to the discussion above, the first forward V-blade fitting 446 comprises a first forward protuberance 454 configured to be received within a first forward V-groove 456 that is part of the ducted fan case 438. In similar fashion, the second forward V-blade fitting 448 comprises a second forward protuberance 458 configured to be received within a second forward V-groove 460 that is part of the ducted fan case 438. In various embodiments, the first forward V-groove 456 and the second forward V-groove 460 comprise a single forward V-groove that extends circumferentially about the entire circumference of the ducted fan case 438. In similar fashion, the first aft V-blade fitting 447 comprises a first aft protuberance 455 configured to be received within a first aft V-groove 457 that is part of the ducted fan case 438. In similar fashion, the second aft V-blade fitting 449 comprises a second aft protuberance 459 configured to be received within a second aft V-groove 461 that is part of the ducted fan case 438. In various embodiments, the first aft V-groove 457 and the second aft V-groove 461 may provide a single aft V-groove that extends circumferentially about the entire circumference of the ducted fan case 438. Further, in various embodiments, each of the upper and lower V-blade fittings is configured to extend about one-hundred eighty degrees (180°) about the ducted fan case 438 when assembled. Also, in various embodiments, and as schematically illustrated in FIG. 4C, an attachment mechanism 470 (or a plurality of attachment mechanisms) may be employed to secure the first frame structure 432 to second frame structure 434 to complete assembly of the ducted fan engine module 430.

Figure 5:
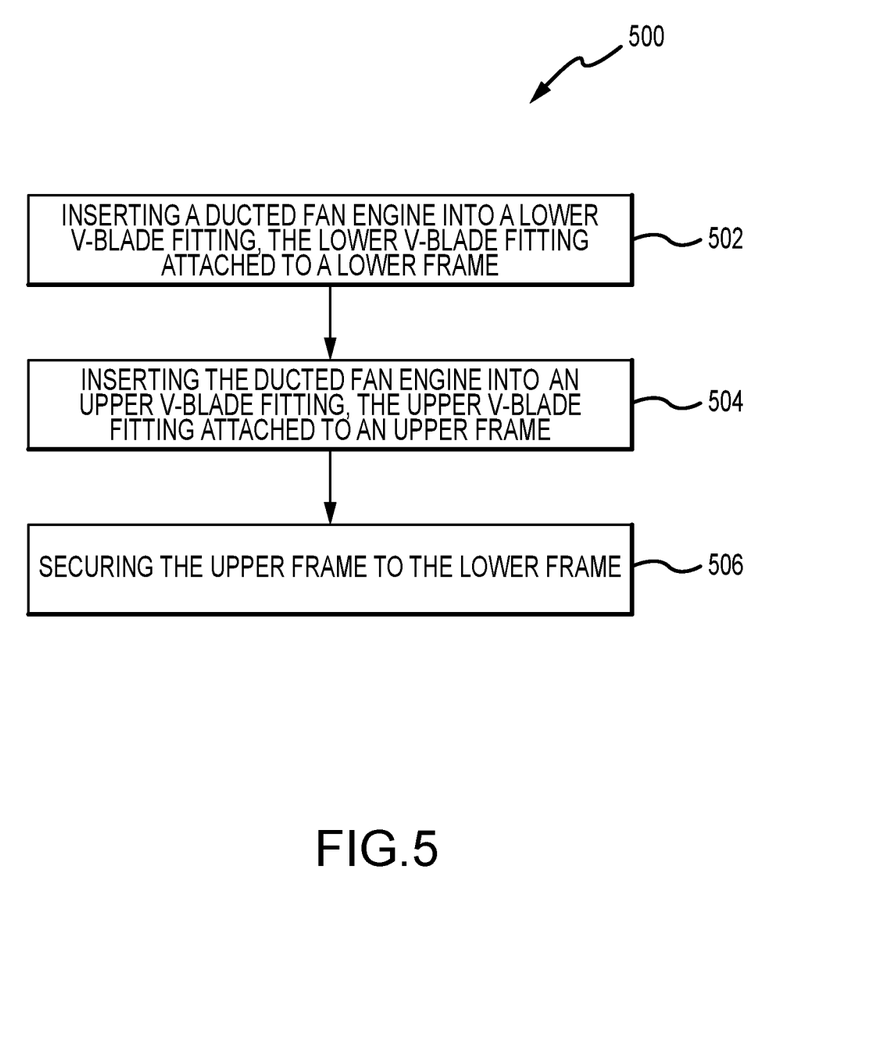
FIG. 5 is a method flowchart illustrating various steps taken during assembling a ducted fan engine module, in accordance with various embodiments.

Referring now to FIG. 5, and with continued reference to FIGS. 4A-4C, a method 500 for assembling a ducted fan engine module, similar to the ducted fan engine module 430 described above with reference to FIGS. 4A-4C, is described. A first step 502 includes inserting a ducted fan engine into a lower V-blade fitting, where, in various embodiments, the lower V-blade fitting is secured to a lower frame. A second step 504 includes inserting the ducted fan engine into an upper V-blade fitting, where, in various embodiments, the upper V-blade fitting is secured to an upper frame. A third step 506 includes securing the upper frame to the lower frame via a suitable attachment mechanism. A method of disassembling a ducted fan engine module (or removing A ducted fan engine from the module) is performed by simply reversing the assembly steps described above. Note the steps of inserting the ducted fan engine into either of the lower V-blade fitting or the upper V-blade fitting may be accomplished in various ways. For example, the step of inserting a ducted fan engine into a lower V-blade fitting may be accomplished by lowering the ducted fan engine onto the lower V-blade fitting. Similarly, the step of inserting the ducted fan engine into the upper V-blade fitting may be accomplished by raising the ducted fan engine into the upper V-blade or by lowering the V-blade fitting onto the ducted fan engine. Further, there is no preference is the order of accomplishing the various steps of inserting the ducted fan engine into the V-blade fitting. Various other iterations of assembling the ducted fan engine module are contemplated, such as, for example, rotating the frame of reference such that the inserting steps are accomplished from a left to right perspective or from a right to left perspective. Further, it is noted that while the foregoing embodiments are generally described with reference to upper and lower components, the disclosure also contemplates left and right components or other orientations. As such, reference to first or second components refers broadly to upper or lower components, left or right components, or first or second components having no preferred orientation. The foregoing method and the apparatus described above provide an efficient, lightweight and low cost manner of securing a ducted fan engine within a frame or an airframe of an aircraft, which also provides an efficient manner of gaining access to the ducted fan engine in the event of required maintenance of repair.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method for assembling a ducted fan engine module, comprising:
    inserting a ducted fan engine into a lower V-blade fitting, the lower V-blade fitting secured to a lower frame;
    inserting the ducted fan engine into an upper V-blade fitting, the upper V-blade fitting secured to an upper frame; and
    securing the upper frame to the lower frame;
    wherein the ducted fan engine includes a ducted fan case having a lower V-groove configured to receive the lower V-blade fitting and an upper V-groove configured to receive the upper V-blade fitting, wherein the upper V-groove is on an opposing side of the ducted fan case from the lower V-groove.

2. The method of claim 1, wherein the lower V-blade fitting is configured to extend about one-hundred eighty degrees about the ducted fan case in a circumferential direction when received by the lower V-groove.

3. The method of claim 2, wherein the upper V-blade fitting is configured to extend about one-hundred eighty degrees about the ducted fan case in the circumferential direction when received by the upper V-groove.

4. The method of claim 3, wherein the lower V-groove extends about the ducted fan case about one-hundred eighty degrees in the circumferential direction.

5. The method of claim 4, wherein the upper V-groove extends about the ducted fan case about one-hundred eighty degrees in the circumferential direction.

6. The method of claim 5, wherein the lower V-blade fitting is secured to the lower frame via a first fastener.

7. The method of claim 6, wherein the upper V-blade fitting is secured to the upper frame via a second fastener.

8. The method of claim 7, wherein at least one of the upper V-blade fitting and the lower V-blade fitting is characterized as having a half-circular geometry configured to mate with at least one of the upper V-groove and the lower V-groove.

9. A ducted fan engine module, comprising:
    a ducted fan engine having a ducted fan case configured to house a fan;
    a first V-blade fitting secured to a first frame; and
    a second V-blade fitting secured to a second frame;
    wherein the ducted fan case has a first V-groove configured to receive the first V-blade fitting and a second V-groove configured to receive the second V-blade fitting, wherein the second V-groove is on an opposing side of the ducted fan case from the first V-groove.

10. The ducted fan engine module of claim 9, wherein the lower first frame is connected to an airfoil of an aircraft wing.

11. The ducted fan engine module of claim 9, wherein the second frame is connected to an airfoil of an aircraft wing.

12. The ducted fan engine module of claim 9, wherein the first V-blade fitting is configured to extend about one-hundred eighty degrees about the ducted fan case in a circumferential direction when received by the first V-groove.

13. The ducted fan engine module of claim 12, wherein the second V-blade fitting is configured to extend about one-hundred eighty degrees about the ducted fan case in the circumferential direction when received by the second V-groove.

14. The ducted fan engine module of claim 13, wherein the first V-groove extends about the ducted fan case about one-hundred eighty degrees in the circumferential direction.

15. The ducted fan engine module of claim 14, wherein the second V-groove extends about the ducted fan case about one-hundred eighty degrees in the circumferential direction.

16. The ducted fan engine module of claim 9, wherein:
the first V-blade fitting is a lower V-blade fitting;
the first frame is a lower frame;
the second V-blade fitting is an upper V-blade fitting; and
the second frame is an upper frame.

17. The ducted fan engine module of claim 16, wherein the first V-groove is a lower V-groove and the second V-groove is an upper V-groove.

* * * * *

UNITED STATES PATENT AND TRADEMARK OFFICE
CERTIFICATE OF CORRECTION

| | |
|---|---|
| PATENT NO. | : 11,613,372 B2 |
| APPLICATION NO. | : 17/093152 |
| DATED | : March 28, 2023 |
| INVENTOR(S) | : Michael Aten |

It is certified that error appears in the above-identified patent and that said Letters Patent is hereby corrected as shown below:

In the Claims

Claim 10, Column 9, Line 2: please delete the word "lower"

Signed and Sealed this
First Day of August, 2023

*Katherine Kelly Vidal*

Katherine Kelly Vidal
*Director of the United States Patent and Trademark Office*